(12) United States Patent
Arthur et al.

(10) Patent No.: US 8,174,504 B2
(45) Date of Patent: May 8, 2012

(54) INPUT DEVICE AND METHOD FOR ADJUSTING A PARAMETER OF AN ELECTRONIC SYSTEM

(75) Inventors: Kevin Arthur, San Jose, CA (US);
William R. Mason, III, Apots, CA (US);
Shawn P. Day, San Jose, CA (US)

(73) Assignee: Synaptics Incorporated, Santa Clara, CA (US)

( * ) Notice: Subject to any disclaimer, the term of this patent is extended or adjusted under 35 U.S.C. 154(b) by 539 days.

(21) Appl. No.: 12/391,011

(22) Filed: Feb. 23, 2009

(65) Prior Publication Data
US 2010/0097332 A1    Apr. 22, 2010

Related U.S. Application Data

(60) Provisional application No. 61/107,245, filed on Oct. 21, 2008.

(51) Int. Cl.
*G06F 3/041* (2006.01)
(52) U.S. Cl. ........................... 345/173; 715/863
(58) Field of Classification Search ............... 345/173
See application file for complete search history.

(56) References Cited

U.S. PATENT DOCUMENTS

| | | | |
|---|---|---|---|
| 5,327,161 A | 7/1994 | Logan et al. | |
| 5,543,590 A | 8/1996 | Gillespie et al. | |
| 5,543,591 A | 8/1996 | Gillespie et al. | |
| 5,825,352 A | 10/1998 | Bisset et al. | |
| 5,880,411 A | 3/1999 | Gillespie et al. | |
| 5,889,236 A | 3/1999 | Gillespie et al. | |
| 5,943,052 A | 8/1999 | Allen et al. | |
| 6,958,749 B1 | 10/2005 | Matsushita et al. | |
| 7,030,861 B1 | 4/2006 | Westerman et al. | |
| 7,138,983 B2 | 11/2006 | Wakai et al. | |
| 7,469,381 B2 | 12/2008 | Ording | |
| 2005/0046621 A1* | 3/2005 | Kaikuranta | 345/173 |
| 2006/0025218 A1 | 2/2006 | Hotta | |
| 2006/0026521 A1 | 2/2006 | Hotelling et al. | |
| 2006/0031786 A1 | 2/2006 | Hillis et al. | |
| 2006/0033721 A1 | 2/2006 | Woolley et al. | |
| 2006/0097991 A1 | 5/2006 | Hotelling et al. | |

(Continued)

FOREIGN PATENT DOCUMENTS

JP    2001-134382    5/2001

(Continued)

OTHER PUBLICATIONS

International search report for PCT/US2009/033540 dated Apr. 4, 2010.

(Continued)

*Primary Examiner* — Adam R Giesy
(74) *Attorney, Agent, or Firm* — Ingrassia Fisher & Lorenz, P.C.

(57) ABSTRACT

Input devices and methods are provided for effecting adjustment, in which a sensing system is adapted to detect motion of a first object and a second object in a sensing region and a processing system coupled to the sensing system. The processing system is adapted to detect a change in position of the first object relative to the second object, the first and second objects being simultaneously present in the sensing region, and effect a change in a parameter in response to a motion of the first object in the sensing region.

32 Claims, 14 Drawing Sheets

U.S. PATENT DOCUMENTS

| | | | |
|---|---|---|---|
| 2006/0274046 | A1 | 12/2006 | Hillis et al. |
| 2007/0046643 | A1 | 3/2007 | Hillis et al. |
| 2007/0103452 | A1 | 5/2007 | Wakai et al. |
| 2007/0130547 | A1 | 6/2007 | Boillot |
| 2007/0236475 | A1 | 10/2007 | Wherry |
| 2007/0262951 | A1 | 11/2007 | Huie et al. |
| 2008/0036743 | A1 | 2/2008 | Westerman et al. |
| 2009/0207140 | A1* | 8/2009 | Hansson .................... 345/173 |

FOREIGN PATENT DOCUMENTS

| | | |
|---|---|---|
| JP | 2001-290585 | 10/2001 |
| JP | 2002-091649 | 3/2002 |
| JP | 2002-311820 | 10/2002 |
| WO | 03088202 | 10/2003 |
| WO | 2007149357 | 12/2007 |
| WO | 2008001202 | 1/2008 |

OTHER PUBLICATIONS

Multi-Touch Systems That I Have Known and Loved, Bill Buxton, Microsoft Research, updated on Oct. 9, 2009, retreived on Dec. 9, 2009; URL: http://www.billbuxton.com/multitouchOverview.html.

Dean Harris Rubine, "The Automatic Recognition of Gestures," CMU-CS-91-202, Dec. 1991, 285 pages.

Paul Dietz et al., "DiamondTouch: A Multi-User Touch Technology," ACM 2001, 1-58113-438, pp. 219-226.

Jun Rekimoto, "SmartSkin: An Infrastructure for Freehand Manipulation on Interactive Surfaces," CHI 2002, Apr. 20-25, 2002, Minneapolis, MN, pp. 113-120.

Dean Rubine, "Combining Gestures and Direct Manipulation," CHI 1992, pp. 659-660.

Wayne Westerman, "Hand Tracking, Finger Identification, and Chordic Manipulation on a Multi-Touch Surface," Dissertation submitted to the Faculty fof the University of Delaware, 1999, 363 pages.

Mike Wu et al., "Multi-Finger and Whole Hand Gestural Interaction Techniques for Multi-User Tabletop Displays," ACM 2003 1-58113-636-6/03/0010, pp. 193-202.

International Search Report, PCT/US2009/059685 dated Aug. 5, 2010.

USPTO "Non-Final Office Action" mailed Dec. 12, 2011; U.S. Appl. No. 12/247,048, filed Oct. 7, 2008.

* cited by examiner

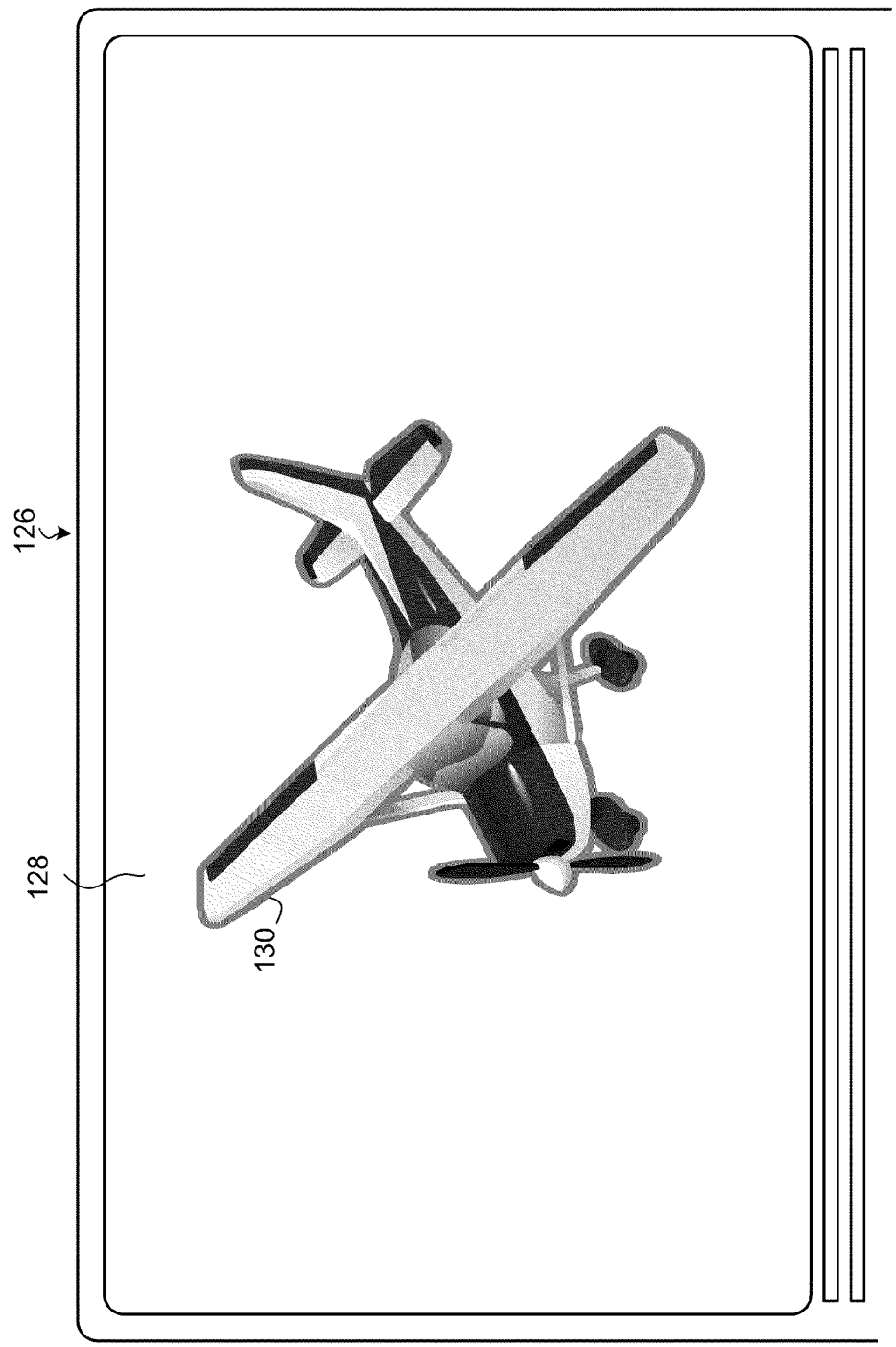

INPUT DEVICE AND METHOD FOR ADJUSTING A PARAMETER OF AN ELECTRONIC SYSTEM

PRIORITY DATA

This application claims priority of U.S. Provisional Patent Application Ser. No. 61/107,245, which was filed on Oct. 21, 2008, and is incorporated herein by reference.

FIELD OF THE INVENTION

This invention generally relates to electronic devices, and more specifically relates to input devices, such as proximity sensor devices.

BACKGROUND OF THE INVENTION

Proximity sensor devices (also commonly called touchpads or touch sensor devices) are widely used in a variety of electronic systems. A proximity sensor device typically includes a sensing region, often demarked by a surface, which uses capacitive, resistive, inductive, optical, acoustic and/or other technology to determine the presence, location and/or motion of one or more fingers, styli, and/or other objects. The proximity sensor device, together with finger(s) and/or other object(s), may be used to provide an input to the electronic system. For example, proximity sensor devices are used as input devices for larger computing systems, such as those found integral within notebook computers or peripheral to desktop computers. Proximity sensor devices are also used in smaller systems, including handheld systems such as personal digital assistants (PDAs), remote controls, digital cameras, video cameras, communication systems such as wireless telephones and text messaging systems. Increasingly, proximity sensor devices are used in media systems, such as CD, DVD, MP3, video or other media recorders or players.

Many electronic devices include a user interface (UI) and an input device for interacting with the UI (e.g., interface navigation). A typical UI includes a screen for displaying graphical and/or textual elements. The increasing use of this type of UI has led to a rising demand for proximity sensor devices as pointing devices. In these applications the proximity sensor device may function as a value adjustment device, cursor control device, selection device, scrolling device, graphics/character/handwriting input device, menu navigation device, gaming input device, button input device, keyboard and/or other input device.

There is a continuing need for improvements in input devices. In particular, there is a continuing need for improvements in the usability of proximity sensors as pointing devices in UI applications.

BRIEF SUMMARY OF THE INVENTION

A method for effecting adjustment of a parameter is provided. A change in position of a first object relative to a second object in a sensing region is detected. The first object and the second object are simultaneously present in the sensing region. A first measurement descriptive of the change in position of the first object relative to the second object in the sensing region is determined. A first adjustment to the parameter is indicated in response to the change in position of the first object relative to the second object in the sensing region. A magnitude of the first adjustment is based on the first measurement. A motion of the first object in the sensing region after the detecting the change in position of the first object relative to the second object in the sensing region is detected. A second measurement descriptive of the motion of the first object relative to the sensing region is determined. A second adjustment to the parameter is indicated in response to the detecting the motion of the first object and a continuous presence of at least one of the first and second objects in the sensing region between a beginning of the change in position of the first object relative to the second object in the sensing region and a beginning of the motion of the first object in the sensing region. A magnitude of the second adjustment to the parameter is based on the second measurement.

A method for effecting adjustment of a parameter using a sensor device having a sensing region is provided. A change in an angle descriptive of a position of a first object relative to a second object in the sensing region is detected. The first object and the second object are simultaneously present in the sensing region. An adjustment mode for effecting adjustment of the parameter is entered after the detecting the change in an angle. A motion of the first object in the sensing region after the detecting the change in the angle is detected. A measurement descriptive of the motion of the first object relative to the sensing region is determined. An adjustment to the parameter is indicated after the entering the adjustment mode in response to the detecting the motion of the first object in the sensing region. A magnitude of the adjustment to the parameter is based on the measurement.

An input device is provided. The input device includes a sensing system adapted to detect the presence and motion of a first object and a second object in a sensing region and a processing system coupled to the sensing system. The processing system is adapted to determine a first measurement descriptive of a change in position of the first object relative to the second object in the sensing region, indicate a first adjustment to a parameter in response to the change in position of the first object relative to the second object in the sensing region, wherein a magnitude of the first adjustment to the parameter is based on the first measurement, determine a second measurement descriptive of a motion of the first object relative to the sensing region, the motion of the first object occurring after the change in position of the first object relative to the second object in the sensing region, and indicate a second adjustment to the parameter in response to the motion of the first object and a continuous presence of at least one of the first and second objects in the sensing region between a beginning of the change in position of the first object relative to the second object in the sensing region and a beginning of the motion of the first object in the sensing region, wherein a magnitude of the second adjustment to the parameter is based on the second measurement.

An input device is provided. The input device includes a sensing system adapted to detect the presence and motion of a first object and a second object in a sensing region and a processing system coupled to the sensing system. The processing system is adapted to detect a change in an angle descriptive of a position of a first object relative to a second object in the sensing region, the first object and the second object being simultaneously present in the sensing region, enter an adjustment mode to effect adjustment of the parameter after the detecting the change in the angle, detect a motion of the first object in the sensing region after the detecting the change in the angle, determine a measurement descriptive of the motion of the first object relative to the sensing region, and indicate an adjustment to the parameter in response to the detecting the motion of the first object in the sensing region, wherein a magnitude of the adjustment to the parameter is based on the measurement.

A program product is provided. The program product includes an input device program and a computer-readable medium bearing the input device program. The input device program is adapted to detect a change in position of a first object relative to a second object in a sensing region, the first object and the second object being simultaneously present in the sensing region, determine a first measurement descriptive of the change in position of the first object relative to the second object in the sensing region, indicate a first adjustment to a parameter in response to the change in position of the first object relative to the second object in the sensing region, wherein a magnitude of the first adjustment to the parameter is based on the first measurement, detect a transition event after the change in position of the first object relative to the second object in the sensing region, detect a motion of the first object in the sensing region after the transition event, determine a second measurement descriptive of the motion of the first object relative to the sensing region, and indicate a second adjustment to the parameter in response to the motion of the first object and a continuous presence of at least one of the first and second objects in the sensing region between a beginning of the transition event and a beginning of the motion of the first object in the sensing region, wherein a magnitude of the second adjustment to the parameter is based on the second measurement.

BRIEF DESCRIPTION OF DRAWINGS

The preferred exemplary embodiment of the present invention will hereinafter be described in conjunction with the appended drawings, where like designations denote like elements, and:

FIGS. 18-20 are plan views of the display illustrating the changing of the parameter of the image displayed thereon in response to the movements of the objects within the sensing region illustrated in FIGS. 13-17.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention provides an input device and method that facilitates improved usability. Specifically, the input device and method provides a mapping between object motion on the device and the resulting action on the display. As one example, the input device and method allow a user to change a parameter of an electronic system using various combinations of inputs, providing a more enjoyable user experience and improved performance.

Figure 1:
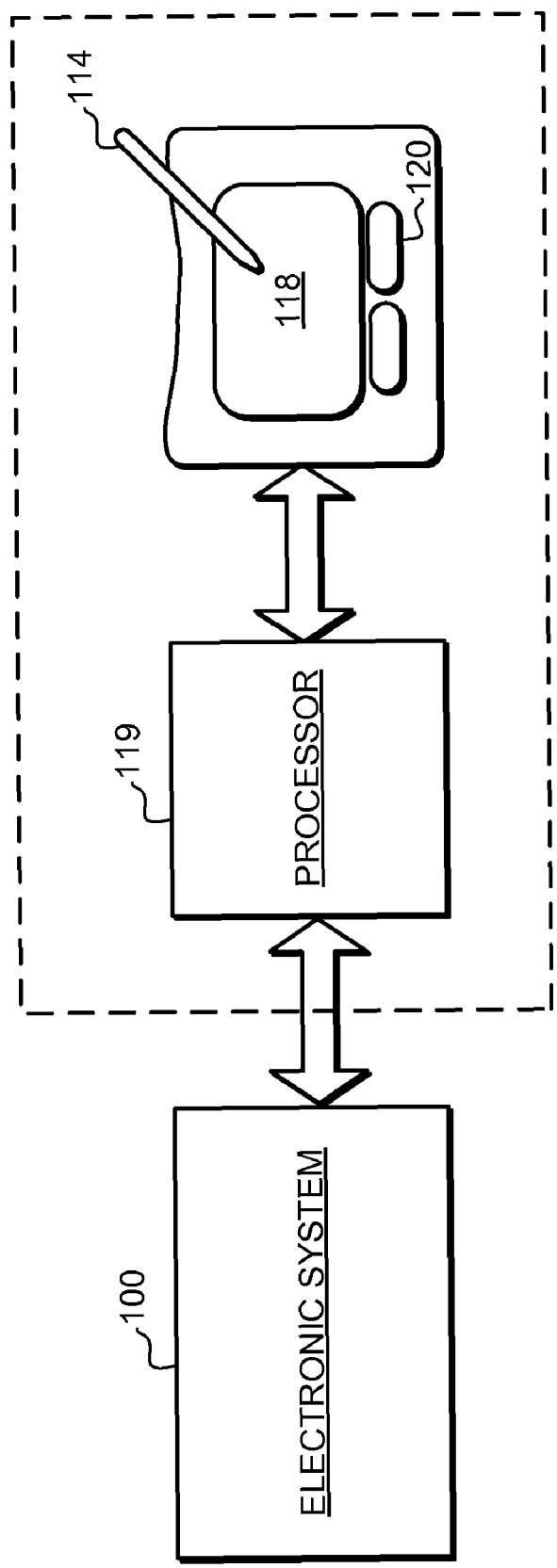
FIG. 1 is a block diagram of an exemplary system including an input device in accordance with an embodiment of the invention.

Turning now to the figures, FIG. 1 is a block diagram of an exemplary electronic system 100 that is coupled to an input device, or proximity sensor device, 116. The electronic system 100 is meant to represent any type of personal computer, portable computer, workstation, personal digital assistant, video game player, communication device (including wireless phones and messaging devices), media device, including recorders and players (including televisions, cable boxes, music players, and video players), digital camera, video camera or other device capable of accepting input from a user and of processing information. Accordingly, the various embodiments of the system 100 may include any type of processor, memory or display. Additionally, the elements of the system 100 may communicate via a bus, network or other wired or wireless interconnection. The input device 116 may be connected to the system 100 through any type of interface or connection, including I$^2$C, SPI, PS/2, Universal Serial Bus (USB), Bluetooth, RF, IRDA, or any other type of wired or wireless connection to list several non-limiting examples.

The input device 116 (e.g., touchpad) includes a processing system (or processor) 119 and a sensing region 118. The input device 116 is sensitive to the position of a stylus 114 or a finger and/or other input object within the sensing region 118. "Sensing region" 118 as used herein is intended to broadly encompass any space above, around, in and/or near the input device 116 in which the sensor of the input device is able to detect a position of the object. In a conventional embodiment, the sensing region 118 extends from the surface of the sensor in one or more directions for a distance into space until signal-to-noise ratios prevent object detection. This distance may be on the order of less than a millimeter, millimeters, centimeters, or more, and may vary significantly with the type of position sensing technology used and the accuracy desired. Other embodiments may require contact with the surface, either with or without applied pressure. Accordingly, the planarity, size, shape and exact locations of the particular sensing regions will vary widely from embodiment to embodiment.

In operation, the input device 116 suitably detects a position of the stylus 114, finger or other input object within the sensing region 118, and using the processing system 119, provides electrical or electronic indicia of the positional information to the electronic system 100. The system 100 appropriately processes the indicia to accept inputs from the user, to move a cursor or other object on a display, or for any other purpose.

The input device 116 includes a sensor (not shown) that utilizes any combination of sensing technology to implement one or more sensing regions 118. The input device 116 may use a variety of techniques for detecting the presence of an object, and may include one or more electrodes or other structures adapted to detect object presence. As several non-limiting examples, the input device 116 may use capacitive, resistive, inductive, surface acoustic wave, and/or optical techniques. Many of these techniques are advantageous to ones requiring moving mechanical structures (e.g. mechanical switches) as they may have a substantially longer usable life. In a common capacitive implementation of a touch sensor device, a voltage is typically applied to create an electric field across a sensing surface. Capacitive input devices detect the position of an object by detecting changes in capacitance caused by the changes in the electric field due to the object. Likewise, in a common resistive implementation, a flexible top layer and a bottom layer are separated by insulating elements, and a voltage gradient is created across the layers. Pressing the flexible top layer creates electrical contact between the top layer and bottom layer. Resistive input devices detect the position of the object by detecting the voltage output due to the relative resistances between driving electrodes at the point of contact of the object. In an inductive implementation, the sensor might pick up loop currents induced by a resonating coil or pair of coils, and use some combination of the magnitude, phase and/or frequency to determine distance, orientation or position. In all of these cases, the input device 116 detects the presence of the object and delivers indicia of the detected object to the electronic system 100. For example, the sensor of the input device 116 may use arrays of capacitive sensor electrodes to support any number of sensing regions 118. As another example, the sensor may use capacitive sensing technology in combination with resistive sensing technology to support the same sensing region or different sensing regions. Examples of the types of technologies that may be used to implement the various embodiments of the invention can be found in U.S. Pat. No. 5,543,591, U.S. Pat. No. 6,259,234 and U.S. Pat. No. 5,815,091, each assigned to Synaptics Inc.

The processing system 119, sometimes referred to as a proximity sensor processor or touch sensor controller, is coupled to the sensor and the electronic system 100. In general, the processing system 119 receives electrical signals from the sensor, processes the electrical signals, and communicates with the electronic system 100. The processing system 119 is adapted to perform a variety of processes on the signals received from the sensor to implement the input device 116. For example, the processing system 119 may select or connect individual sensor electrodes, detect presence/proximity, calculate position or motion information, and report a position or motion when a threshold is reached, and/or interpret and wait for a valid tap/stroke/character/button/gesture sequence before reporting it to the electronic system 100, or indicating it to the user. The processing system 119 may also determine when certain types or combinations of object motions occur proximate the sensor. For example, the processing system 119 may determine the direction in which an object is moving when it lifts from the sensor, and may generate the appropriate indication in response to that motion.

In this specification, the term "processing system" is defined to include one or more processing elements that are adapted to perform the recited operations. Thus, the processing system 119 may comprise all or part of one or more integrated circuits, firmware code, and/or software code that receive electrical signals from the sensor and communicate with the electronic system 100. In some embodiments, all processing elements that comprise the processing system 119 are located together, in or near the input device 116. In other embodiments, these elements may be physically separated, with some elements of the processing system 119 close to the input device 116, and some elsewhere (such as near other circuitry for the electronic system 100). In this latter embodiment, minimal processing may be performed by the elements near the input device 116, and the majority of the processing may be performed by the elements elsewhere.

Furthermore, the processing system 119 may be physically separate from the part of the electronic system that it communicates with, or the processing system 119 may be implemented integrally with that part of the electronic system. For example, the processing system 119 may reside at least partially on a processing system performing other functions for the electronic system aside from implementing the input device 116.

Again, as the term is used in this application, the term "electronic system" broadly refers to any type of device that communicates with input device 116. The electronic system 100 may thus comprise any type of device or devices in which a touch sensor device may be implemented or coupled to. The input device 116 may be implemented as part of the electronic system 100, or coupled to the electronic system using any suitable technique. As non-limiting examples, the electronic system 100 may thus comprise any type of computing device, media player, communication device, or another input device (such as another touch sensor device or keypad). In some cases, the electronic system 100 is itself a peripheral to a larger system. For example, the electronic system 100 may be a data input or output device, such as a remote control or display device, that communicates with a computer or media system (e.g., remote control for television) using a suitable wired or wireless technique. It should also be noted that the various elements (processor, memory, etc.) of the electronic system 100 may be implemented as part of an overall system, as part of the touch sensor device, or as a combination thereof. Additionally, the electronic system 100 may be a host or a slave to the input device 116.

In the illustrated embodiment, the input device 116 is implemented with buttons 120. The buttons 120 may be implemented to provide additional input functionality to the input device 116. For example, the buttons 120 may be used to facilitate selection of items using the input device 116. Of course, this is just one example of how additional input functionality may be added to the input device 116. In other implementations, the input device 116 may include alternate or additional input devices, such as physical or virtual switches, or additional proximity sensing regions. Conversely, the input device 116 may be implemented with no additional input devices.

Likewise, the positional information provided by the processing system 119 may be any suitable indicia of object presence. For example, the processing system 119 may be implemented to provide "zero-dimensional" 1-bit positional information, "one-dimensional" positional information (e.g. along a sensing region) as a scalar, "two-dimensional" or "three-dimensional" vector positional information (e.g. horizontal/vertical/depth axes, angular/radial axes, or any other combination of axes that span the two or three dimensions) as a combination of values, and the like. Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. As will be described in greater detail below, the positional information from the processing system 119 facilitates a full range of interface inputs, including use of the input device 116 as a pointing device for cursor control.

In some embodiments, the processing system 119 may also be adapted to perform other functions in the input device 116. For example, the processing system 119 may be configured to select or connect individual sensor electrodes, detect presence/proximity, calculate position or motion information, and report a position or motion when a threshold is reached, and/or interpret and wait for a valid tap/stroke/character/button/gesture sequence before reporting it to the electronic device 100, or indicating it to the user.

It should be noted that although the various embodiments described herein are referred to as "proximity sensor devices," these terms as used herein are intended to encompass not only conventional input devices, but also a broad range of equivalent input devices that are capable of detecting the position of a one or more fingers, pointers, styli and/or other objects. Such devices may include, without limitation, touch screens, touch pads, touch tablets, biometric authentication devices, handwriting or character recognition devices, and the like. Again, as the term is used in this application, the term "electronic device" broadly refers to any type of device that communicates with input device 116. The electronic device 100 may thus comprise any type of device or devices in which a touch sensor device and may be implemented or coupled to. Accordingly, proximity sensor devices may appropriately detect more than the mere presence or absence of an object and may encompass a broad range of equivalents.

Furthermore, the input device 116 may be implemented as part of the electronic system 100, or coupled to the electronic system 100 using any suitable technique. As non-limiting examples the electronic system 100 could thus comprise any type of computing device, media player, communication device or gaming device. In some cases the electronic system 100 is itself a peripheral to a larger system. For example, the electronic system 100 may be a data input or output device, such as a remote control or display device, that communicates with a computer or media system (e.g., remote control for television) using a suitable wired or wireless technique. It should also be noted that the various elements (e.g., display screen, processor, memory, etc.) of the electronic system 100 may be implemented as part of an overall system, as part of the input device, or as a combination thereof. Additionally, the electronic device 100 may be a host or a slave to the input device 116.

In the embodiments of the present invention, the input device 116 is adapted to provide the ability for a user to easily cause adjustments in an electronic system using the input device 116 as part of a user interface. For example, it may be used to facilitate user interface navigation, such as scrolling, panning, menu navigation, cursor control, and the like. As another example, it may be used to facilitate value adjustments, such as changing a device parameter, including visual parameters such as color, hue, brightness, and contrast, auditory parameters such as volume, pitch, and intensity, operation parameters such as speed and amplification. The input device 116 may also be used for control of mechanical devices, such as in controlling the movement of a machine.

It should also be understood that while the embodiments of the invention are to be described here in the context of a fully functioning proximity sensor device, the mechanisms of the present invention are capable of being distributed as a program product in a variety of forms. For example, the mechanisms of the present invention may be implemented and distributed as a proximity sensor program on a computer-readable signal bearing media. Additionally, the embodiments of the present invention apply equally regardless of the particular type of computer-readable signal bearing media used to carry out the distribution. Examples of signal bearing media include recordable media such as memory sticks/cards/modules, optical and magnetic disks, and hard drives.

In at least some embodiments of the invention, the input device and method are implemented with a mapping between finger (or other object) motion on an input device and the resulting pointer motion on a computer display.

The techniques described herein are intended to facilitate the adjusting of various parameters of the functionality of the electronic system 100. Examples of such parameters include a parameter of an image (e.g., a picture or text), settings of a display device (such as brightness, color, contrast, etc.), and audio settings (such as volume, balance, treble level, bass level, etc.). In one embodiment, the parameter relates to an image being displayed by a display device, such as a size of the image (e.g., zoom level) or a vertical or horizontal position of the image (e.g., scrolling).

These techniques may be explained as combining two or more movements, or gestures, of objects in the sensing region 118 to initiate a changing, and continuation of the change, of a particular parameter. Alternatively, the two or more movements may be understood to jointly form a single gesture with multiple portions. In one embodiment, the presence of two (or more) objects is detected within the sensing region 118, followed by a first movement of at least one of the objects, causes the parameter to be changed. If at least one of the objects remains in the sensing region and performs a second movement after a "transition event" is detected, the change in the parameter is continued. The removal of the objects from the sensing region 118 causes a cessation in the change, and the process may be reinitiated by again placing the two objects in the sensing region 118. However, if one of the objects remains in the sensing region 118 and undergoes a third movement, the change in the parameter may be "reversed."

Figure 4:
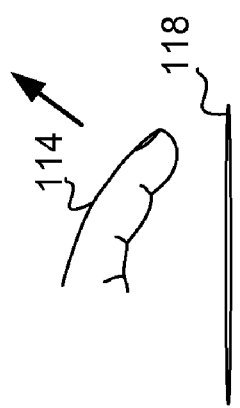
FIGS. 2-4 are side views of a sensing region of the input device of FIG. 1 illustrating the presence of an object on, movement of the object across, and removal of the object from a surface associated with the sensing region of the input device.
Figure 3:
Figure 2:

FIGS. 2-25 illustrate operation of the systems and methods described above, according to various embodiments of the present invention. FIGS. 2-4 illustrate one example of an object being within the sensing region 118, moved across the sensing region 118, and removed from the sensing region 118. Specifically, FIG. 2 illustrates an input object 114 (e.g., a finger of a user) being placed (or being already positioned within) the sensing region 118. FIG. 3 illustrates the input object 114 being moved across the sensing region 118, which correspond to one of the movements described above. FIG. 4 illustrates the input object 114 being lifted out of, or removed from, the sensing region 118.

FIGS. 5-9 are plan views of the sensing region 118 during a sequence of movements of two input objects 114 within the sensing region 118. The location of the tips of the input objects 114 in the sensing region 118 are indicated by interface circles 122 and 124, which represent the interface of the input objects 114 with the sensing region 118. That is, circles 122 and 124 indicate the particular areas of the sensing region 118 in which the input objects 114 are placed and moved (i.e., the portions of the objects 114 within the sensing region). Therefore, in the following discussion the terms "input objects" and "interface circles" may be used interchangeably. The "dashed" appearance of circle 122 in FIG. 7 indicates the particular area of the sensing region 118 where the respective input object 114 is removed from the sensing region 118.

Figure 9:
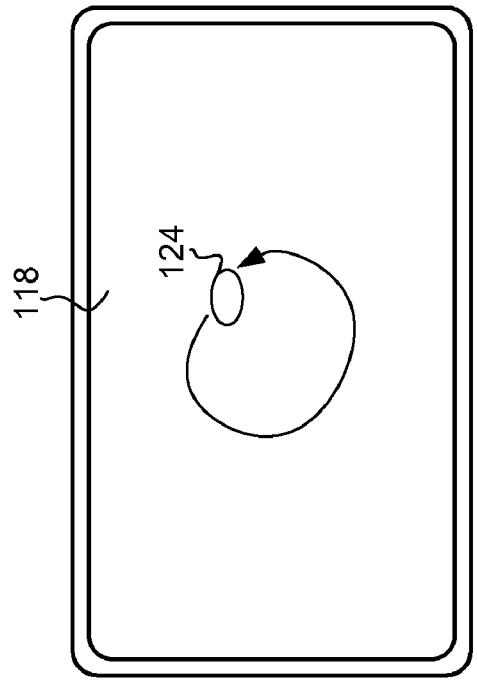
Figure 10:
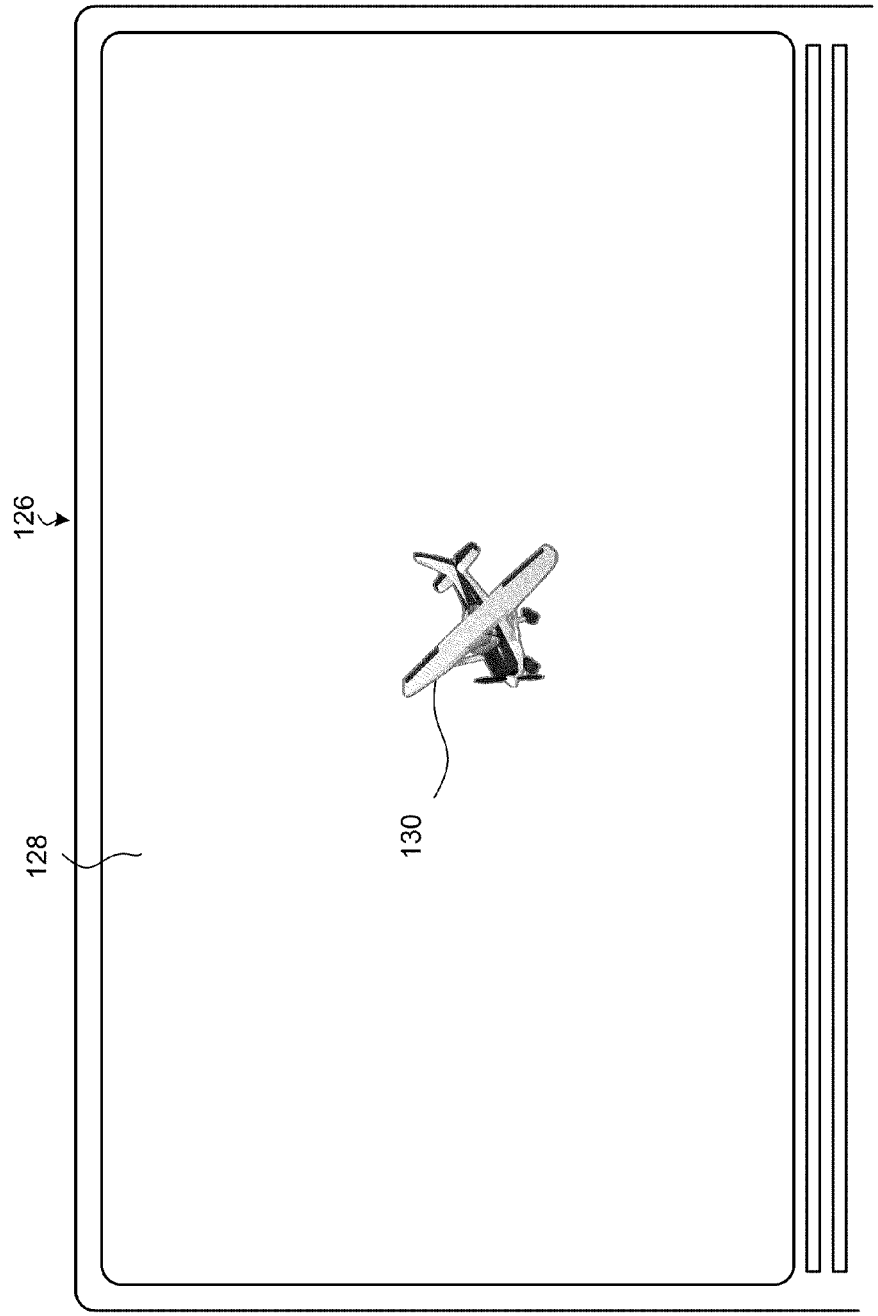
FIGS. 10-12 are plan views of a display illustrating the changing of a parameter of an image displayed thereon in response to the movements of the objects within the sensing region illustrated in FIGS. 5-9.
Figure 11:
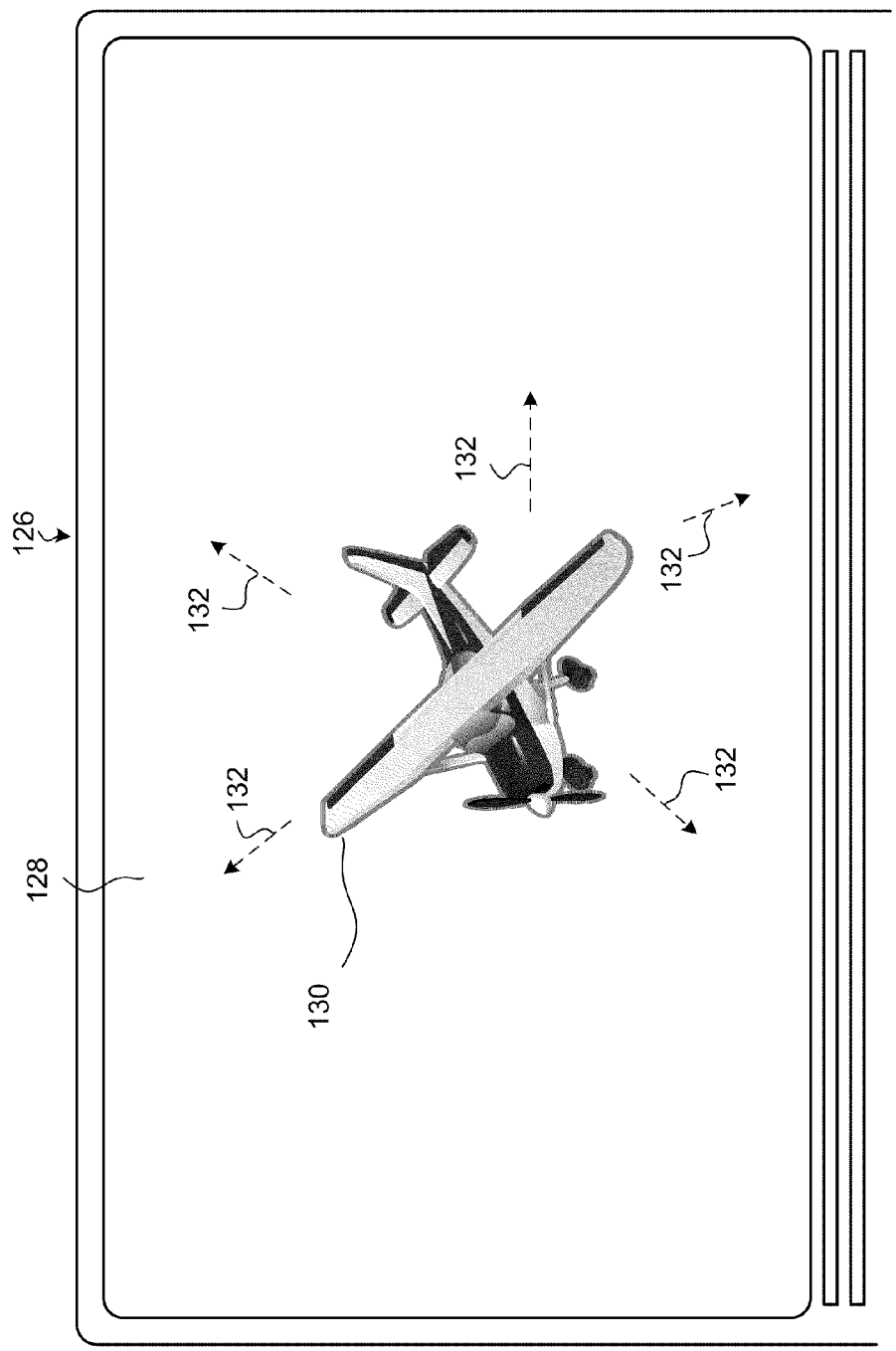
Figure 12:
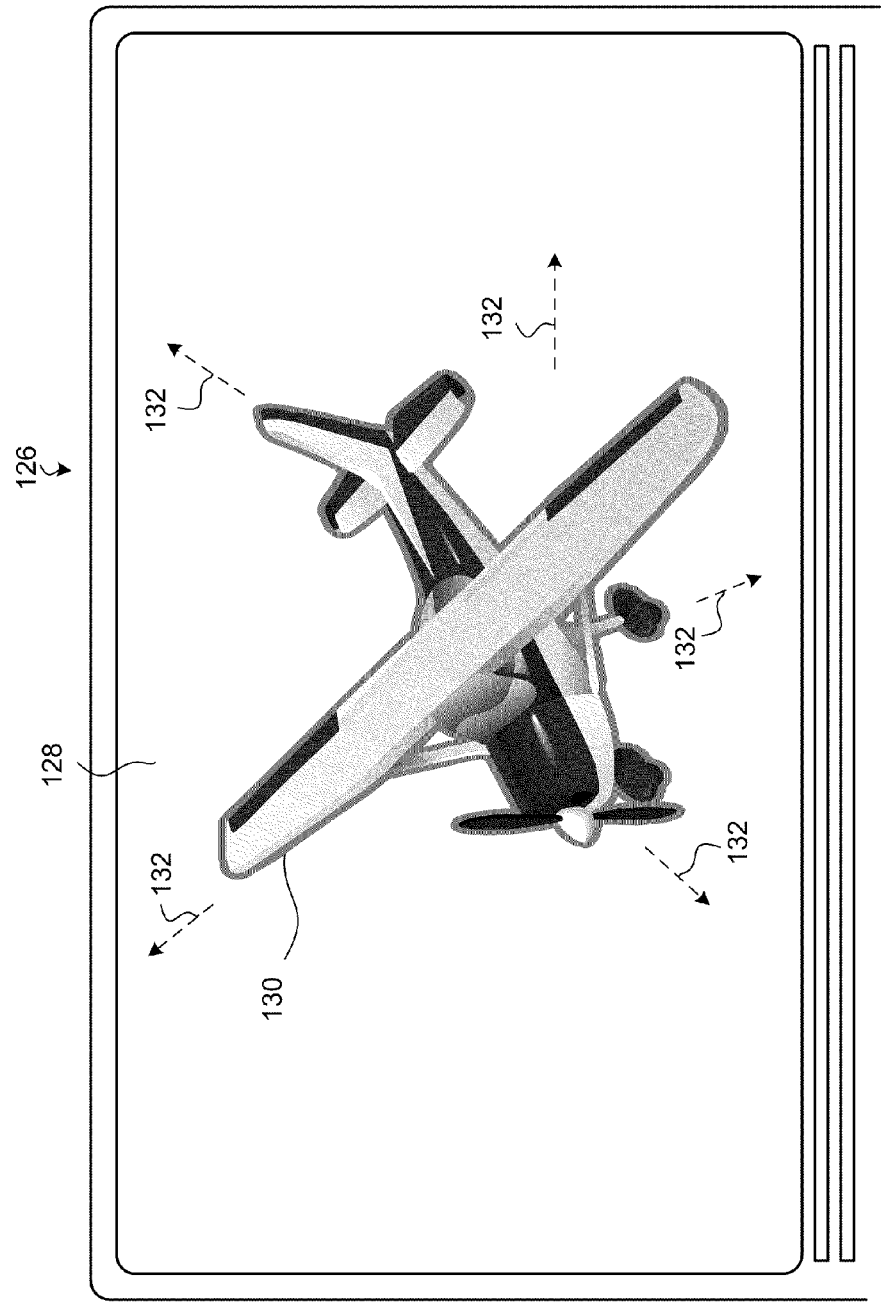

FIGS. 10-12 are plan views of a display device 126, having a display 128, in operable communication with the input device 116 (FIG. 1) illustrating adjustments or changes made to a parameter of an exemplary image 130 displayed on the display 128 in response to the movements of the input objects 114 depicted in FIGS. 5-9. Although the image 130 is shown as a picture representative of an object (e.g., an airplane), it should be understood that the word "image" as used herein is meant to refer any visual design generated by the display device 126, such as pictures (i.e., videos or still images) of objects, various types of text and other symbols, and/or schematics and maps.

Figure 5:
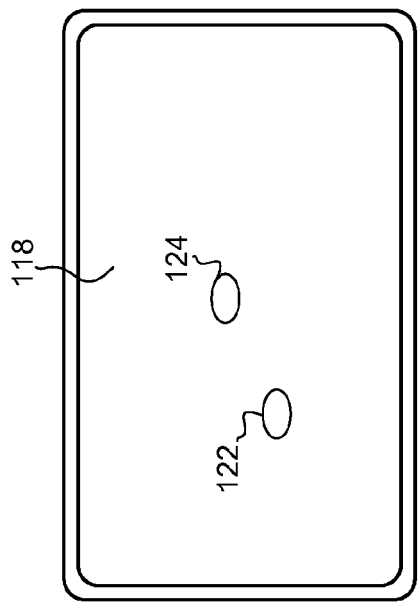

Initially, as shown in FIG. 5, the simultaneous presence of two input objects 114 in the sensing region 118 is sensed. In particular, FIG. 5 illustrates the sensing region 118 with the input objects 114 (e.g., two fingers or one finger and one thumb of the user) being stationary within the sensing region 118, as indicated by the lack of movement of interface circles 122 and 124.

Figure 6:
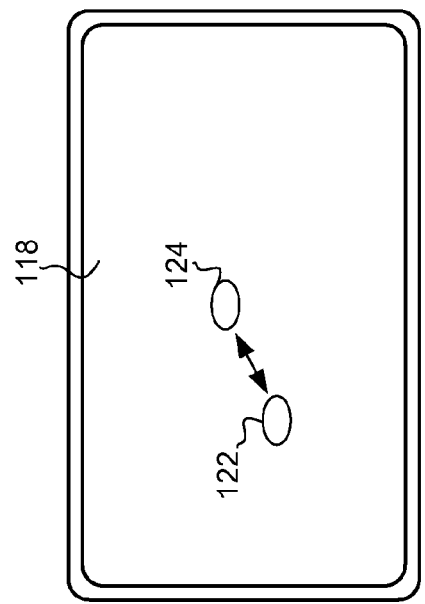
FIGS. 5-9 are plan views of the sensing region of FIGS. 2-4 illustrating the movements of two objects therein, according to one embodiment of the present invention.

As illustrated in FIG. 6, the interface circles 122 and 124 (i.e., the input objects 114) undergo a first movement such that their relative positions are changed (i.e., a first motion). According to one aspect of the present invention, a measurement (or first measurement) that is descriptive of the relative change in positions of the interface circles 122 and 124 is determined and used as described below. In the particular example shown, the measurement of the relative change in positions may be a change (e.g., an increase) in a distance between the circles 122 and 124.

It should be understood that in at least one embodiment, the change in the parameter may be initiated with the movement of only one of the input objects 114 (e.g., interface circle 122 remains stationary while interface circle 124 moves towards interface circle 122). The magnitude of the change in the parameter is, in one embodiment, based on a measurement that is descriptive of the movement(s) of circles 122 and 124 (e.g., the distance between circles 122 and 124). For example, in one embodiment, the zoom level of the image 130 is increased proportionally to the increase in the distance between circles 122 and 124.

In alternate embodiments, the measurement descriptive of relative positions of the interface circles 122 and 124 may include other various types of measurements. For example, the measurement may include the distance between determined centers of the first object and the second object (or the interface circles 122 and 124). Alternatively, the measurement may include a direction defined by the position of the first object and the position of the second object. For example, the direction may be that of a vector pointing from the first object towards the second object, or vice versa. Such a direction may be measured as an angle relative to an appropriate reference frame (e.g. using a polar coordinate system with a defined zero angular direction, using a Cartesian coordinate system where direction aligned with the positive X-axis is considered zero and counter-clockwise angles from the X-axis are considered positive, etc.). As a further example, the direction may be measured as an angle defined by the two positions and a reference such as a line (e.g. the angle between a line intersecting the determined centers of the first and second objects and a reference line). The reference may also be made dynamic and may be based on factors such as previous input positions, initial locations, and the like. The reference may also be made user settable.

Furthermore, the measurement may include a combination of different quantities descriptive of the relative positions. For example, the measurement may include a combination of both the distance between objects and the direction defined by the objects.

It should also be noted that, in many embodiments, the step of determining the measurement does not require that the actual positions of the objects be calculated, or the actual centers be determined. For example, the direction defined by the objects and/or the distance between the objects may be determined without explicitly calculating the position of each object. Some embodiments effectively use arbitrary choices among possible sets of positions for the first and second objects. In these embodiments, different sets of potential positions of the first and second objects exist, and a value for the measurement is determined from one or more of these sets of potential positions even if the potential positions are actual positions of the first and second objects. A specific example uses a capacitive profile-type sensor device with a sensor array containing sets of sensor electrodes aligned along orthogonal axes. Such a capacitive profile-type sensor effectively measures the total capacitive coupling of each of the sensor electrodes to input objects, such that two single axes profiles are generated to describe two-dimensional (2D) locations of any number of objects in the sensing region 118. Thus, if a first input object and a second input object are placed near the sensor electrodes, it may be ambiguous from the profiles which of the potential positions of the first and second objects reflect the true positions of the objects. However, the distance between the potential positions are the same in both sets. Therefore, using the distance as the measurement would mean that the actual positions need not be determined.

Also, the relative positions of the first and second objects may stay substantially the same (such that the objects are substantially stationary relative to each other) even if the objects are moving with respect to another frame of reference. For example, if the first and second objects are moving through the sensing region 118 with the same velocities, the first and second objects would not be in motion relative to each other even though they would be in motion relative to the sensing region 118.

In any of these cases, the determined measurement (relative position and/or angle) may be used to make a first adjustment to a parameter, as shown in FIGS. 10 and 11. In the depicted embodiment, the particular parameter of the image 130 that is changed is a size of the image 130, or a "zoom" level, as is commonly understood. The exemplary size of the image 130 shown in FIG. 10 corresponds to the positions of the circles 122 and 124 as shown in FIG. 5. As the interface circles 122 and 124 move apart (FIG. 6), the image 130 is increased in size (or "zoomed in"), as indicated by zoom arrows 132 (which may not be visible to the user), as indicated in FIG. 11. In one embodiment, the change in parameter is not initiated until after it is determined that the detected movement(s) of circles 122 and 124 are indicative of a desired change in the parameter (e.g., until an initial threshold in the distance between circles 122 and 124 is passed).

Figure 7:
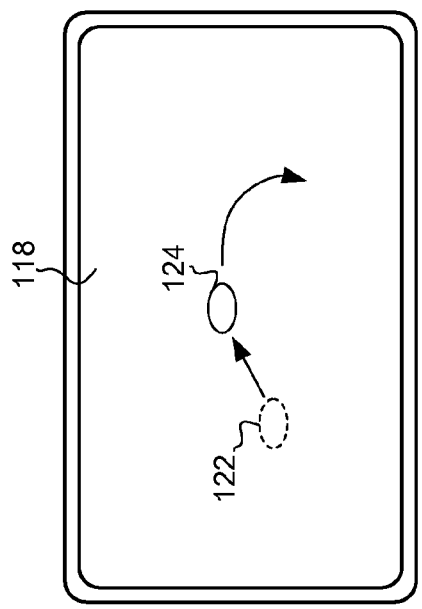

Referring now to FIG. 7, a "transition" event, or a mode switching event, is detected after the first movement. The exemplary transition event shown in FIG. 7 is removal of the input object 114 corresponding to circle 122 from the sensing region 118, while circle 124 continues to move (i.e., a second motion). That is, one of the input objects 114 is removed from the sensing region and the other input object remains in the sensing region. In the example shown, interface circle 124 moves along an arcuate path after the transition event.

Other examples of actions by the objects 114 that may be used as the transition event include the distance and/or angle (or a change in the distance and/or angle) between the two object passing a threshold (high or low), and the radius of curvature of a movement of one of the objects 114 passing a threshold (high or low), for example one of the objects 114 moving in a "whirling" manner (with a relatively small radius of curvature) for a predetermined amount of time.

Figure 8:
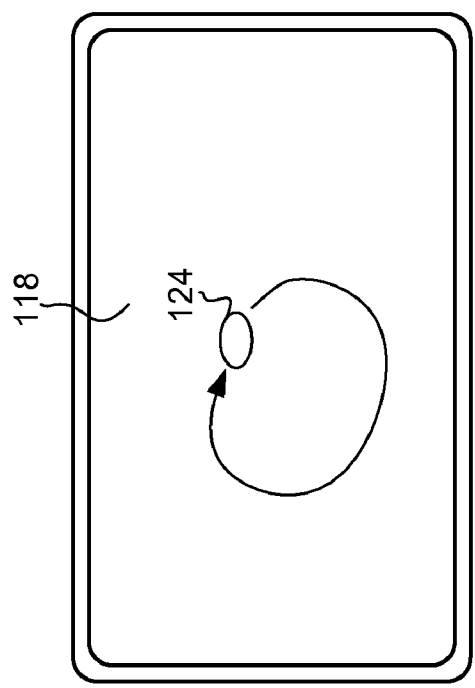

Referring to FIG. 8, interface circle 124 continues to move along, for example, the arcuate path initiated in FIG. 7, and may thus continue to turn in the same direction. In a manner similar to that described above, a measurement that is descriptive of the movement of one of the input objects 114 in the sensing region 118 (e.g., interface circle 124) after the transition event is determined and used to further adjust the parameter. The motion of interface circle 124 may include any path shape, and the measurement for the adjustment may be based on the path length. The parameter may be continually adjusted in the same manner as determined by the change in angle of the interface circles 122 and 124. As such, referring to FIG. 12, in the depicted embodiment, the image continues to increase in size. In one embodiment, the continuation of the change in the parameter only occurs if one or both of the input objects 114 remains within the sensing region 118 continuously between the beginning of the transition event and the beginning of the motion of the input object(s) 114 after the transition event.

In one embodiment, the magnitude of the continuation of the change in the parameter is based on a measurement (e.g., path length) that is descriptive of the movement of circle 124 after the transition event is detected. In one embodiment, the measurement may include a path length measurement (a measurement of the total length of the path traveled by an object). Examples of path length calculations include a measurement derived from a filtered or idealized estimate of the movement of circle 124, and a summation of linear segments approximating the path traveled by circle 124. In other embodiments, alternate measurements may include displacement along one or more axes (such as an X or Y axis in the Cartesian coordinate system), and ratios of displacements along select axes of the path traveled. The change in the parameter may continue so long as interface circle 124 continues to move along the arcuate path initiated in FIG. 7 (i.e., in the same predominant turning direction). In another embodiment, the change in the parameter may continue so long as interface circle 124 remains within the sensor region. In an embodiment in which the transition event is one of the objects 114 being moved in a whirling motion, the movement of circle 124 that causes the change in the parameter to continue may be a "round scrolling" motion which includes moving in a circular motion, but with a radius curvature that is greater than that of the whirling motion.

In one embodiment, the measurement may include a path length measurement (a measurement of the total length of the path traveled by an object). In alternate embodiments, measurements may include displacement along one or more axes (such as an X or Y axis in the Cartesian coordinate system), ratios of displacements along select axes of the path traveled, a measurement derived from a filtered or idealized estimate of the movement of circle 124, and a summation of segments of the path traveled by circle 124.

In one embodiment, after one of the objects 114 is removed, and circle 124 continues to move along an arcuate path, the image 130 continues to increase in size, as shown in FIG. 12. It should be noted that in some embodiments, the continuation of the change in the parameter may occur if both objects 114 remain in the sensing region between motions depicted in FIGS. 6 and 7. In such an embodiment, the second gesture or motion may be considered to be the arcuate motion of one of both of the circles 122 and 124. In another embodiment, after one of the objects 114 is removed, circle 124 may move in a linear path such as a straight line segment, multiple linear paths that may trace out polygons such as rectangles, a nonlinear path such as a wavy line segment, a partial arc, or one or more circular paths, and any number of paths. For example, the path can cross over itself one or more times.

As shown in FIG. 8, as circle 124 continues to turn, the path may become indicative of the respective input object 114 undergoing a "whirling" motion (i.e., a series of loops or circles). The image 130 in FIG. 12 may continue to increase in size as long as the whirling motion depicted continues in the same direction (e.g., clockwise).

Referring to FIG. 9, the motion of interface circle 124 is then "reversed," causing the parameter to be adjusted to also be reversed (e.g. reduced in size or "zoomed out") such that it returns to, for example, its size shown in FIGS. 11 and 10, respectively. In one embodiment, the magnitude of the reversed, or opposing, change in the parameter may be based on a determined measurement that is descriptive of the reversed motion, such as the path length of one of the objects 114 (e.g., the object remaining in the sensing region) across, or relative to, the sensing region 118. The reversed direction may be described as a "sharp reversal" or change in angular direction. Sharp reversal may include motion in the opposite direction along the same path or a path with at acute angle relative to the initial path.

The motion that causes the reversal of the change in the parameter may also be defined with respect to a "polarity." When sufficient turning in a particular direction (e.g. clockwise) has occurred, an initial polarity is associated with that turning direction. The polarity may be reversed by abruptly reversing direction (as described above) or, after polarity has been associated with a turning direction, by turning sufficiently in the opposing direction (e.g., counterclockwise) from the polarity-associated direction.

It should be understood that the two most common control gestures may be linear and rotational motions, and as linear motions are natural for small excursions and circular motions natural for larger movements, a unified mechanism for handling both is desirable. Unification of these two types of motion for dimensionality reduction is primarily a function of proper sign management. A continued linear movement in a single direction may not cause a reversal. However, a distinct reversal in direction during a linear movement may cause a reversal. Further, a continued turning movement of a certain handedness may not cause a reversal. However, a distinct reversal in handedness of a rotational motion may If the remaining input object 114 is removed from the sensing region 118, the change in the parameter ceases and the process may be reinitiated by the user. In one embodiment, the change in parameter may be ceased if the input object(s) 114 remains out of the sensing region 118 for a predetermined amount of time (e.g., before the process is reinitiated by the user). If interface circle 124 stops moving, but the input object 114 remains in the sensing region 118, the change in the parameter ceases. However, the user may reinitiate the change by again moving the object 114 in the manner indicated in FIGS. 7 and 8. In one embodiment, if the input object 114 remains in the sensing region 118 and then begins to move along an arcuate path in an opposite turning direction (FIG. 9), the change in the parameter is reversed such that the image 130 is reduced in size (or "zoomed out"). For example, the image 130 may then return to the sizes shown in FIGS. 11 and 10, respectively.

In an alternate embodiment, if the input object 114 remains in the sensing region 118 and then begins to move along an arcuate path in an opposite turning direction (FIG. 9), the change in the parameter is continued such that the image 130 is increased in size (or "zoomed in"). In a further embodiment, the user may continue the adjustment to the parameter in the same manner by leaving the input object 114 within the sensing region 118 and moving the input object 114 in any combination of paths, including; a linear path such as a straight line segment, multiple linear paths that may trace out polygons such as rectangles, a nonlinear path such as a wavy line segment, a partial arc, or one or more circular paths, and any number of paths. For example, the path can cross over itself one or more times. The magnitude of this "opposing change" in the parameter may be based on the path length of the movement of interface circle 124, similar to the movements described above.

In a manner similar to the initial change in the parameter, the opposing change in the parameter may also be ceased by removing the remaining input object 114 from the sensing region 118 or stopping the movement of interface circle 124. As such, in one embodiment, the user may repeatedly change the parameter is opposing manners by leaving the input object 114 within the sensing region 118 and whirling the input object 114 in opposing directions. It should also be noted that, in at least one embodiment, the speed (or rate) at which the change in the parameter occurs is dependent on the speed at which interface circles 122 and 124 are moved. That is, as the speed of the interface circles 122 and 124 increases, the rate at which the parameter is changed increases.

Figure 14:
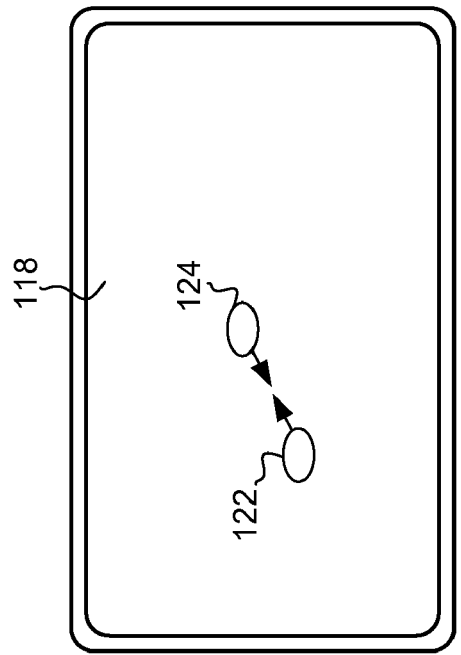
FIGS. 13-17 are plan views of the sensing region of FIGS. 2-4 illustrating the movements of two objects therein, according to another embodiment of the present invention.
Figure 13:
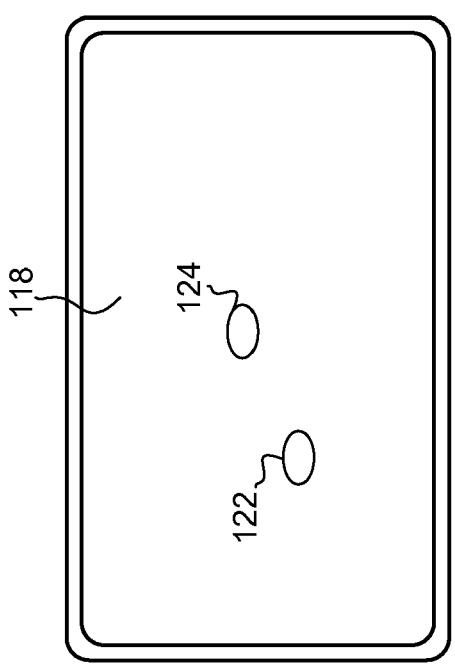
Figure 19:
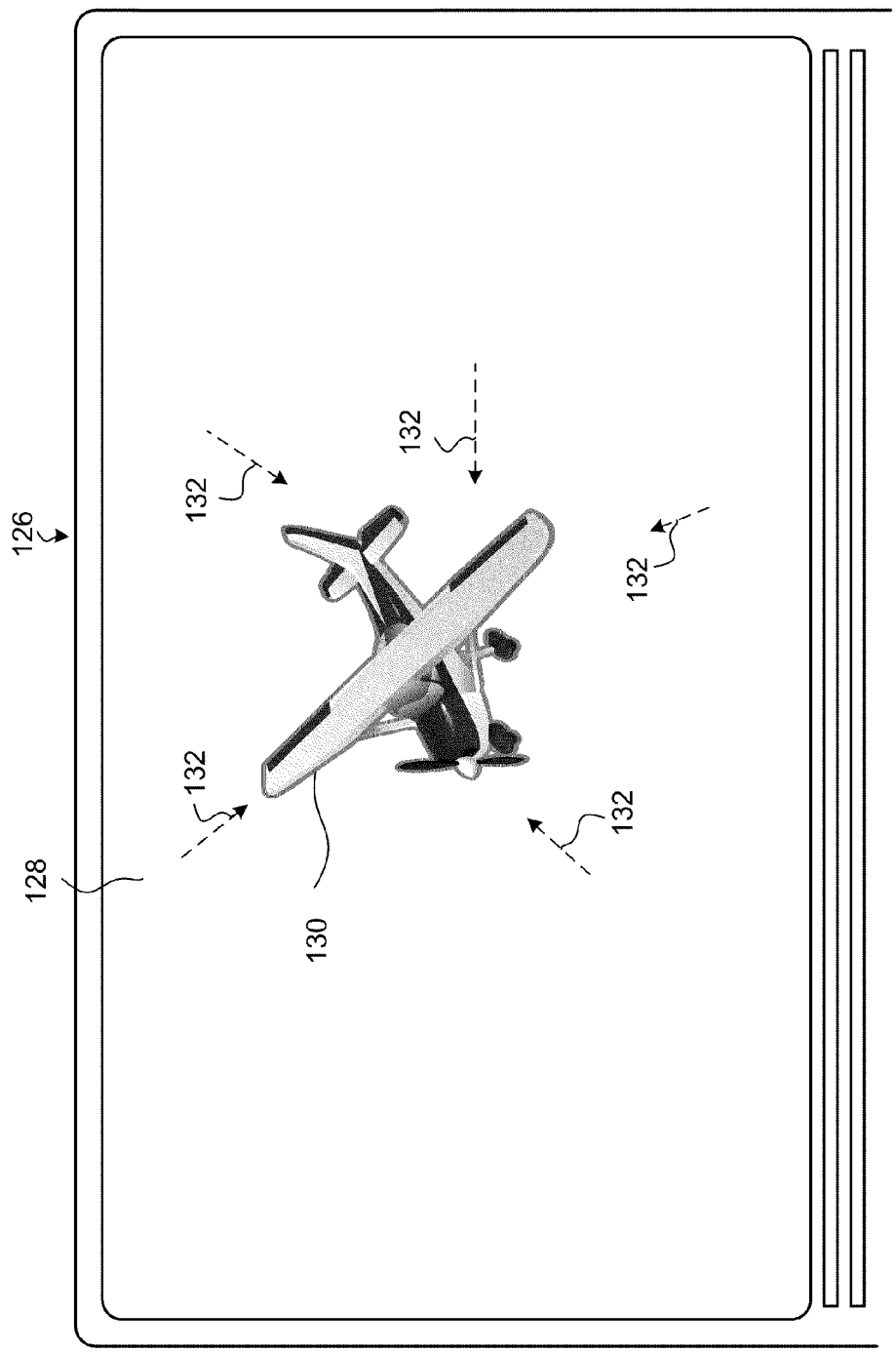
Figure 20:
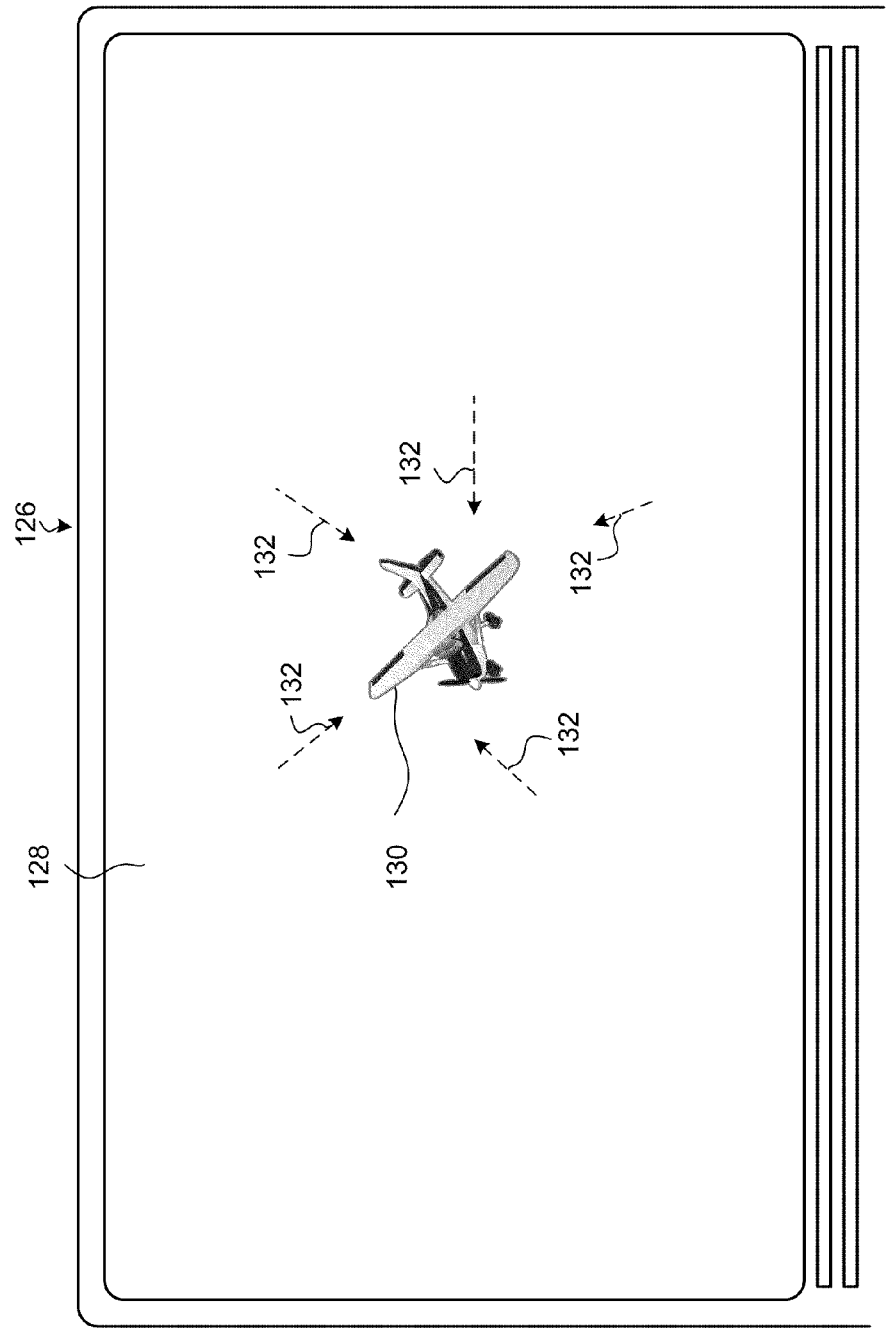

FIGS. 13-20 illustrate the operation of the input device 116 and the display device 126 in another mode of operation, or according to another embodiment. In particular, FIGS. 13-17 illustrate movements of interface circles 122 and 124 similar to those shown in FIGS. 5-9. However, as indicated in FIGS. 13 and 14, the initial movement of the two input objects 114 causes the distance between the interface circles 122 and 124 to decrease. As before, although this motion is shown as being substantially linear, the paths of the moving circles 122 (and/or 124) depicted in FIG. 14 may be understood to be an arcuate path with, for example, a substantially infinite radius of curvature. FIGS. 18-20 illustrate the display device 126 as adjustments or changes are made to the same parameter (e.g., size) of the image 130 in response to the movements of the interface circles 122 and 124 shown in FIGS. 13-17.

As with the embodiment described above, initially, the simultaneous presence of two input objects 114 in the sensing region 118 is sensed, as shown in FIG. 13. The exemplary size of the image 130 shown in FIG. 18 may correspond to the positions of the circles 122 and 124 as shown in FIG. 13.

Referring to FIG. 14, in the depicted embodiment, the interface circles 122 and 124 undergo a first movement such that the distance therebetween is decreased. This decrease in the distance between the circles 122 and 124 may be used as the measurement on which the change in parameter is based (as described above). It should be noted that a change in the angle between circles 122 and 124 may also be used at the measurement, as described above. As a result of the motion shown in FIG. 14, the appropriate parameter is adjusted, which in the depicted embodiment, is a decrease in the size (or "zoom out") of the image 130, as indicated by zoom arrows 132 in FIG. 19.

Figure 15:
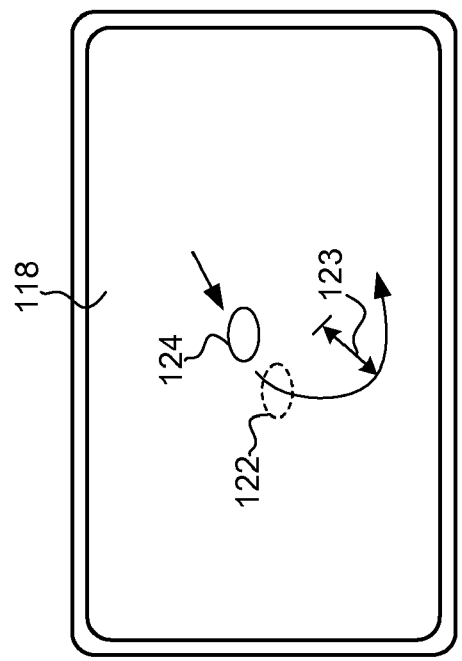

Referring to FIG. 15, a transition event is then detected that causes the system to enter an adjustment mode. As shown, the transition event depicted includes removal of one of the input objects 114 from the sensing region 118. After one of the objects 114 is removed (i.e., the transition event), the adjustment mode is entered, and circle 124 continues to move along a second path (FIG. 15), the image 130 continues to decrease in size, as shown in FIG. 20. As before, the magnitudes of these changes in the parameter may be based on a measurement that is descriptive of the relative positions or movements of circles 122 and 124 (e.g., the path length of the motion of the object(s) 114 relative to the sensing region 118). The process may be ceased in a manner similar to that described above, and likewise, the change in the parameter may be continued by a continuous presence of the remaining input object 114 within the sensing region 118 and a motion of interface circle 124 along a second path with a predominate turning direction in the opposite direction.

Figure 16:
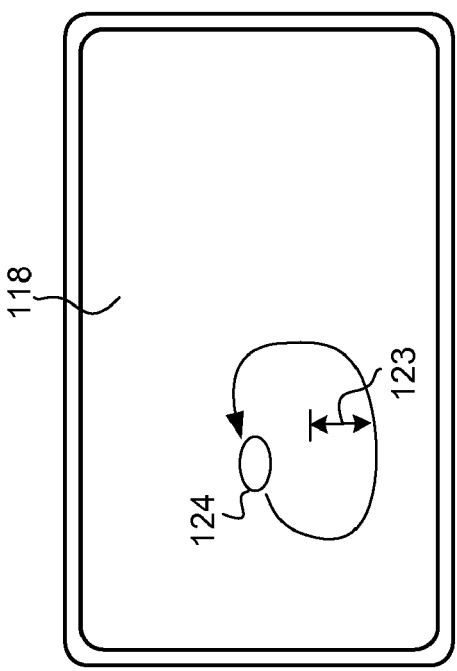

After the adjustment mode is entered, the parameter may continue to be adjusted in the same manner as defined by the initial movement of the two objects 114 (e.g., "zoom out") while the remaining input object 114 (i.e., the corresponding interface circle 124) continues to move along a second path, as shown in FIG. 15. The second path may include any combination of paths, similar to what is described above. As shown in FIG. 16, the interface circle 124 may continue to move along the second path. The motions depicted in FIGS. 15 and 16 may follow paths with a radius of curvature 123, which is smaller than the radius of curvature (e.g., infinite) of the path depicted in FIG. 14.

Figure 17:
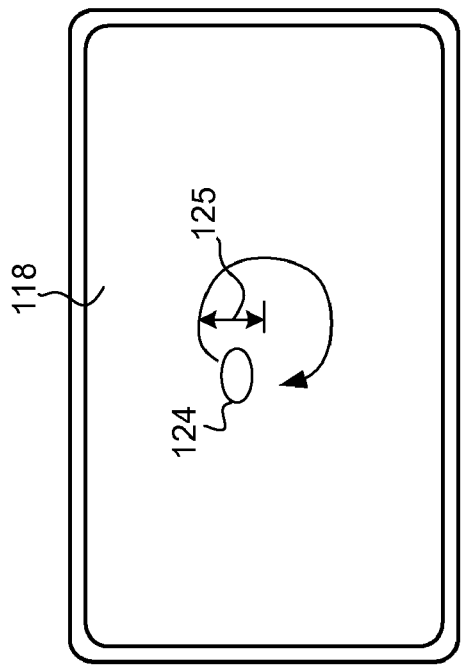

In one embodiment, even if the movement of the remaining input object 114 is reversed, the parameter may continue to be adjusted in the manner defined by the initial movement (e.g., "zoom out"). Thus, as shown in FIG. 17, when interface circle 124 reverses the direction of the turning motion in manner similar to that shown in FIG. 9, the image 130 may continue to decrease in size. The reversed motion of interface circle 124 may follow a third arcuate path, as depicted in FIG. 17, that may have a radius of curvature 125 that is less than the radius of curvature of the path(s) depicted in FIG. 14 and greater than or less than the radius of curvature 123 of the second path (FIG. 15 and/or FIG. 16).

Figure 22:
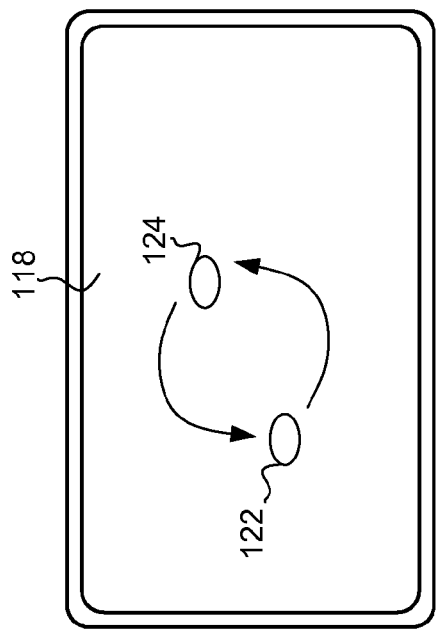
FIGS. 21-25 are plan views of the sensing region of FIGS. 2-4 illustrating the movements of two objects therein, according to a further embodiment of the present invention.
Figure 23:
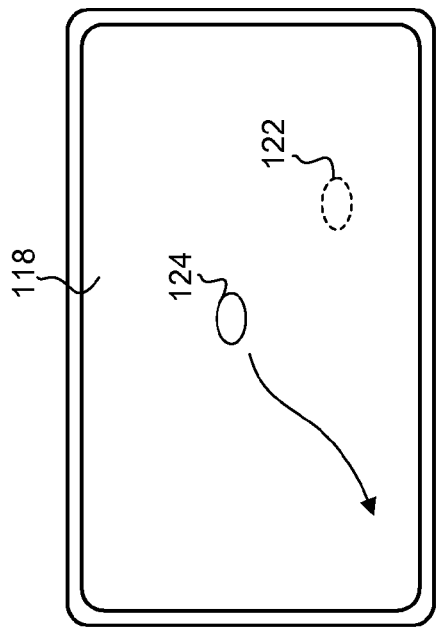
Figure 21:
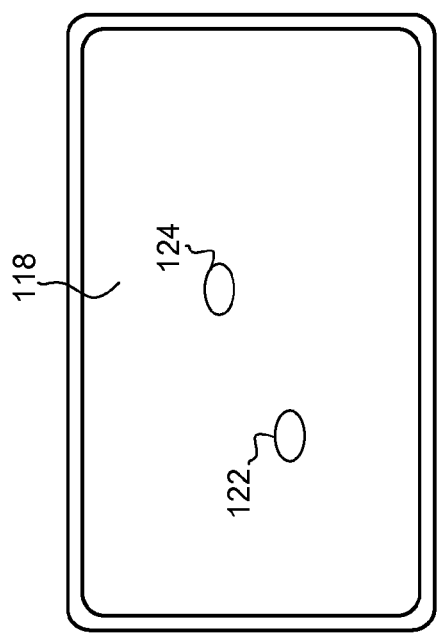
Figure 25:
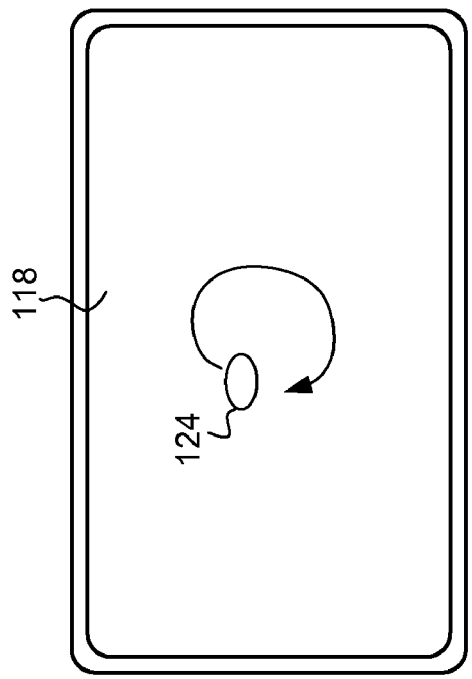
Figure 24:
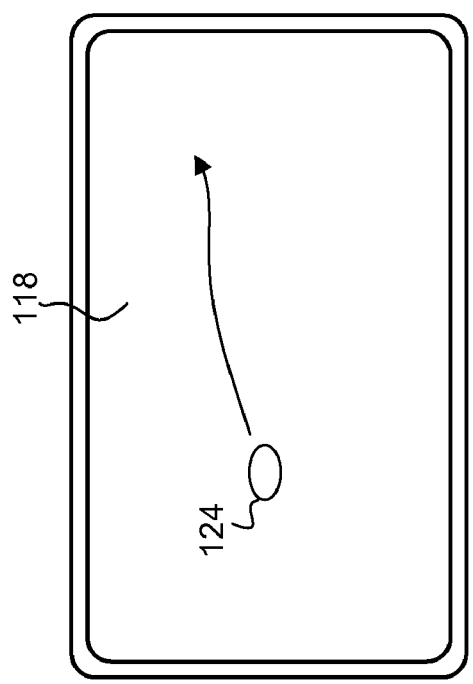

FIGS. 21-25 illustrate movements of interface circles 122 and 124 which may be used to effect changes to an image, for example, similar to those shown in FIGS. 10-12 and/or FIGS. 18-20. As shown in FIG. 21, the input objects 114 are simultaneously sensed within the sensing region 118 such that interface circles 122 and 124 are stationary. Referring to FIG. 22, one or both of the interface circles 122 and 124 are then moved along a first arcuate path (e.g., in a first predominate turning direction) such that an angle descriptive of the relative positions thereof changes. In the depicted embodiment, the distance between interfaces circles 122 and 124 remains substantially constant.

In one embodiment, the initial movement of the interface circles 122 and 124 does not cause any adjustment to the particular parameter. Rather, when the angle descriptive of the relative positions (or a change in the angle) passes a threshold, the system becomes "locked" in an adjustment mode, without detecting an explicit transition event (although the passing of the threshold may be considered a transition event). After entering the adjustment mode, the parameter (e.g., the size of the image 130) is adjusted based on a measurement that is descriptive of one, or both, of the input objects 114 relative to the sensing region 118 (e.g., path length or a change in an angle between the input object(s) 114 and a reference point in the sensing region 118).

With the modal lock being utilized, the manner in which the parameter is adjusted (e.g., "increased" or "decreased") may be determined by the initial movement of the interface circles 122 and 124. For example, the counterclockwise motion of the interface circles shown in FIG. 22 may be used to zoom out, or decrease the size of, the image 130. The decrease in the size of the image 130 may continue regardless of the direction or shape of the motion of the input object(s) 114 after the modal lock, even if the motion is "reversed" in any way. As such, although interface circle 124 does not move along an arcuate path in FIG. 23, the image 130 may continue to decrease in size. Further, the apparent reverse motions shown in FIGS. 24 and 25 may also cause the image 130 to be adjusted in the same way (e.g., zoomed out).

In a manner similar to that described above, the adjustment mode, and the modal lock, may be deactivated by removing the remaining input object(s) from the sensing region 118 (i.e., for a predetermined time). In one embodiment, the modal lock may be deactivated if the input object(s) 114 remains out of the sensing region 118 for a predetermined amount of time (e.g., before the process is reinitiated by the user). The user may then reinitiate the process by positioning both input objects 114 back into the sensing region 118.

In one embodiment, a "chirality" of the path along which one of the objects 114 are moved may be used to determine if the change in the parameter is to be continued and/or when the change is to be reversed (e.g., when the turning motion of the object 114 reverses). A chiral path is a discrete path through two-dimensional space wherein each segment along the path is labeled with one of two possible chiralities. The chirality of a segment is designated by a predominant or "preferred" turn direction. Adapting terminology from organic chemistry for use herein, a levorotary (L) segment is generally part of a left hand turning sequence. A dextrorotary (D) segment is generally turning largely to the right. For example, if circular path is traversed counterclockwise (CCW), its segments are L, or if traversed clockwise, D.

Once the segments of a chiral path have been labeled, it is straightforward to map the path onto a one-dimensional output variable. Chirality serves to establish the sign of the output and the distance traveled serves to establish the magnitude. By convention, L segments produce positive outputs and D paths negative, although other embodiments may use the opposite and/or any other scheme. Deriving the output magnitude from the input path length allows the full dynamic range of the two-dimensional pointing device to be brought to bear on any associated one-dimensional task. This one-dimensional output variable may be used in determining the manner in which the parameter is to be changed (e.g., increasing or decreasing the size of the image 130).

In another embodiment, an angle of the input path along which one of the objects 114 is moved may be used to determine if the change in parameter is to be continued and/or when the change is to be reversed (e.g., when the turning motion of the object 114 reverses). The angle of the input path may be defined by a first displacement-vector and a second displacement-vector immediately following the first displacement-vector along the path. The first displacement-vector represents a displacement from a first position to a second position, and the second displacement-vector represents a displacement from the second position to a third position. The angle of the input path is the angle between the first and second displacement-vectors, where the angle determines the manner in which the parameter is to be changed (e.g., increasing or decreasing the size of the image 130). If the angle is greater than a reference value it is considered to be continued and if it less than a reference value is not considered to be continuing.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A method for effecting adjustment of a parameter comprising:
    detecting a change in position of a first object relative to a second object in a sensing region, the first object and the second object being simultaneously present in the sensing region;
    determining a first measurement descriptive of the change in position of the first object relative to the second object in the sensing region;
    indicating a first adjustment to the parameter in response to the change in position of the first object relative to the second object in the sensing region, wherein a magnitude of the first adjustment to the parameter is based on the first measurement;
    detecting a transition event;
    detecting a motion of the first object in the sensing region after the transition event;
    determining a second measurement descriptive of the motion of the first object relative to the sensing region; and
    indicating a second adjustment to the parameter in response to the detecting the motion of the first object and a continuous presence of at least one of the first and second objects in the sensing region between a beginning of the change in position of the first object relative to the second object in the sensing region and a beginning of the motion of the first object in the sensing region, wherein a magnitude of the second adjustment to the parameter is based on the second measurement.

2. The method of claim 1, wherein the transition event comprises removal of at least one of the first and second objects from the sensing region.

3. The method of claim 1, wherein the transition event comprises the first measurement passing a threshold.

4. The method of claim 1, wherein the determining a first measurement descriptive of the change in position of the first object relative to the second object in the sensing region comprises:
    determining a change in distance descriptive of the change in position of the first object relative to the second object.

5. The method of claim 1, wherein the determining a first measurement descriptive of the change in position of the first object relative to the second object in the sensing region comprises:
    determining a change in angle descriptive of the change in position of the first object relative to the second object.

6. The method of claim 1, further comprising:
    detecting a second motion of the first object in the sensing region after the detecting the motion of the first object in the sensing region, wherein the second motion opposes the first motion;
    determining a third measurement descriptive of the second motion of the first object relative to the sensing region; and
    indicating a third adjustment to the parameter in response to the detecting the second motion of the first object, the third adjustment to the parameter being based on the third measurement, wherein the third adjustment to the parameter does not oppose the second adjustment to the parameter.

7. The method of claim 1, further comprising:
    detecting a second motion of the first object in the sensing region after the detecting the motion of the first object in the sensing region, wherein the second motion opposes the first motion;
    determining a third measurement descriptive of the second motion of the first object relative to the sensing region; and
    indicating a third adjustment to the parameter in response to the detecting the second motion of the first object, the third adjustment to the parameter being based on the third measurement, wherein the third adjustment to the parameter opposes the second adjustment to the parameter.

8. The method of claim 1, wherein the parameter is selected from a group consisting of: a zoom function to an image displayed on a display, and a rotate function to an image displayed on a display.

9. The method of claim 1, wherein the second measurement is a path length of the motion of the first object relative to the sensing region.

10. A method for effecting adjustment of a parameter using a sensor device having a sensing region, the method comprising:
  detecting a change in an angle descriptive of a position of a first object relative to a second object in the sensing region, the first object and the second object being simultaneously present in the sensing region;
  determining a first measurement descriptive of the change in the angle descriptive of the position of the first object relative to the second object;
  indicating a first adjustment in response to the change in the angle, wherein a magnitude of the first adjustment is based on the first measurement;
  entering an adjustment mode for effecting adjustment of the parameter after the detecting the change in an angle;
  detecting a motion of the first object in the sensing region after the detecting the change in the angle;
  determining a second measurement descriptive of the motion of the first object relative to the sensing region; and
  indicating a second adjustment to the parameter after the entering the adjustment mode in response to the detecting the motion of the first object in the sensing region, wherein a magnitude of the second adjustment to the parameter is based on the second measurement.

11. The method of claim 10, wherein the entering the adjustment mode comprises:
  in response to the change in the angle passing a threshold, entering the adjustment mode.

12. The method of claim 10, wherein the measurement is a path length of the motion of the first object relative to the sensing region.

13. An input device comprising:
  a sensing system adapted to detect the presence and motion of a first object and a second object in a sensing region;
  a processing system coupled to the sensing system, the processing system being adapted to:
    determine a first measurement descriptive of a change in position of the first object relative to the second object in the sensing region;
    indicate a first adjustment to a parameter in response to the change in position of the first object relative to the second object in the sensing region, wherein a magnitude of the first adjustment to the parameter is based on the first measurement;
    detect a transition event occurring after the change in position of the first object relative to the second object in the sensing region;
    determine a second measurement descriptive of a motion of the first object relative to the sensing region, the motion of the first object occurring after the detected transition event; and
    indicate a second adjustment to the parameter in response to the motion of the first object and a continuous presence of at least one of the first and second objects in the sensing region between a beginning of the change in position of the first object relative to the second object in the sensing region and a beginning of the motion of the first object in the sensing region, wherein a magnitude of the second adjustment to the parameter is based on the second measurement.

14. The input device of claim 13, wherein the transition event comprises removal of at least one of the first and second objects from the sensing region.

15. The input device of claim 13, wherein the transition event comprises the first measurement passing a threshold.

16. The input device of claim 13, wherein the first measurement descriptive of the change in position of the first object relative to the second object in the sensing region comprises a change in distance.

17. The input device of claim 13, wherein the first measurement descriptive of the change in position of the first object relative to the second object in the sensing region comprises a change in angle.

18. The input device of claim 13, wherein the processing system is further adapted to:
  determine a third measurement descriptive of a second motion of the first object relative to the sensing region; and
  indicate a third adjustment to the parameter in response to the second motion of the first object, the third adjustment to the parameter being based on the third measurement, wherein the third adjustment to the parameter does not oppose the second adjustment to the parameter.

19. The input device of claim 13, wherein the processing system is further adapted to:
  determine a third measurement descriptive of a second motion of the first object relative to the sensing region; and
  indicate a third adjustment to the parameter in response to the second motion of the first object, the third adjustment to the parameter being based on the third measurement, wherein the third adjustment to the parameter opposes the second adjustment to the parameter.

20. The input device of claim 13, wherein the parameter is selected from a group consisting of: a zoom function to an image displayed on a display, and a rotate function to an image displayed on a display.

21. The input device of claim 13, wherein at least the second measurement is a path length of the motion of the first object relative to the sensing region.

22. An input device comprising:
  a sensing system adapted to detect the presence and motion of a first object and a second object in a sensing region;
  a processing system coupled to the sensing system, the processing system being adapted to:
    detect a change in an angle descriptive of a position of a first object relative to a second object in the sensing region, the first object and the second object being simultaneously present in the sensing region;
    determine a first measurement descriptive of the change in the angle descriptive of the position of the first object relative to the second object;
    indicate a first adjustment in response to the change in the angle, wherein a magnitude of the first adjustment is based on the first measurement;
    enter an adjustment mode to effect continued adjustment of the parameter after the detecting the change in the angle;
    detect a motion of the first object in the sensing region after the detecting the change in the angle;
    determine a measurement descriptive of the motion of the first object relative to the sensing region; and
    indicate continued adjustment to the parameter in response to the detecting the motion of the first object in the sensing region wherein a magnitude of the adjustment to the parameter is based on the measurement.

23. The input device of claim 22, wherein the processing system is further adapted to enter the adjustment mode in response to the change in the angle.

24. The input device of claim 22, wherein the measurement is a path length of the motion of the first object relative to the sensing region.

25. A program product comprising:
an input device program adapted to:
detect a change in position of a first object relative to a second object in a sensing region, the first object and the second object being simultaneously present in the sensing region;
determine a first measurement descriptive of the change in position of the first object relative to the second object in the sensing region;
indicate a first adjustment to a parameter in response to the change in position of the first object relative to the second object in the sensing region, wherein a magnitude of the first adjustment to the parameter is based on the first measurement;
detect a transition event after the change in position of the first object relative to the second object in the sensing region;
detect a motion of the first object in the sensing region after the transition event;
determine a second measurement descriptive of the motion of the first object relative to the sensing region; and
indicate a second adjustment to the parameter in response to the motion of the first object and a continuous presence of at least one of the first and second objects in the sensing region between a beginning of the transition event and a beginning of the motion of the first object in the sensing region, wherein a magnitude of the second adjustment to the parameter is based on the second measurement; and
non-transitory computer-readable media bearing the input device program.

26. The program product of claim 25, wherein the transition event comprises removal of at least one of the first and second objects from the sensing region.

27. The program product of claim 25, wherein the transition event comprises the first measurement passing a threshold, and wherein the first measurement comprises at least one of a change in an angle descriptive of a position of the first object relative to the second object in the sensing region and a distance separating the first and second objects.

28. The program product of claim 25, wherein the processing system is further adapted to:
determine a third measurement descriptive of a second motion of the first object relative to the sensing region; and
indicate a third adjustment to the parameter in response to the second motion of the first object and a continuous presence of at least one of the first and second objects in the sensing region between a beginning of the motion of the first object in the sensing region and a beginning of the second motion of the first object in the sensing region, the third adjustment to the parameter being based on the third measurement.

29. The program product of claim 25, wherein the second measurement is a path length of the motion of the first object relative to the sensing region.

30. A method for effecting adjustment of a parameter comprising:
detecting a change in position of a first object and a second object relative to a sensing region, the first object and the second object being simultaneously present in the sensing region;
determining a first measurement descriptive of the change in position of the first object and the second object relative to the sensing region;
indicating a first adjustment to the parameter in response to the change in position of the first object and the second object relative to the sensing region, wherein a magnitude of the first adjustment to the parameter is based on the first measurement;
detecting a transition event after detecting the change in position of the first object and the second object relative to the sensing region;
detecting a motion of the first object in the sensing region after the detecting the transition event;
determining a second measurement descriptive of the motion of the first object relative to the sensing region; and
indicating a second adjustment to the parameter in response to the detecting the motion of the first object and a continuous presence of at least one of the first and second objects in the sensing region between a beginning of the change in position of the first object and the second object relative to the sensing region and a beginning of the motion of the first object in the sensing region, wherein a magnitude of the second adjustment to the parameter is based on the second measurement.

31. The method of claim 30, wherein the transition event comprises removal of at least one of the first and second objects from the sensing region.

32. The method of claim 30, wherein the transition event comprises the first measurement passing a threshold.

* * * * *

UNITED STATES PATENT AND TRADEMARK OFFICE
CERTIFICATE OF CORRECTION

PATENT NO. : 8,174,504 B2  
APPLICATION NO. : 12/391011  
DATED : May 8, 2012  
INVENTOR(S) : Kevin Arthur, William R. Manson, III and Shawn P. Day It is certified that error appears in the above-identified patent and that said Letters Patent is hereby corrected as shown below:

On the title page, at Item [75] – the last name of the second inventor is misspelled; the second inventor's name should read as follows: William R. Manson, III Signed and Sealed this
Eighteenth Day of September, 2012

David J. Kappos
*Director of the United States Patent and Trademark Office*